United States Patent [19]

Kubik

[11] Patent Number: 4,745,832
[45] Date of Patent: May 24, 1988

[54] HYDRAULIC SPEED CONTROL SYSTEM

[76] Inventor: Philip A. Kubik, 1527 Lochridge, Bloomfield Hills, Mich. 48013

[21] Appl. No.: 935,817

[22] Filed: Nov. 28, 1986

[51] Int. Cl.$^4$ .............................................. B23B 3/00
[52] U.S. Cl. .................................... 82/2 A; 82/21 A; 82/59
[58] Field of Search ............ 82/21 R, 59, 21 A, 24 R, 82/14 A, 14 C, 29 A, 2 A; 51/165.87, 165.88, 134.5 R, 165 R, 165.77, 165.9, 134.5 F

[56] References Cited

FOREIGN PATENT DOCUMENTS 0197712 12/1977 U.S.S.R. ............................... 82/2 A

Primary Examiner—Frederick R. Schmidt
Assistant Examiner—Lawrence Cruz
Attorney, Agent, or Firm—Basile and Hanlon

[57] ABSTRACT

An hydraulic control system coordinates the rate of rotation of a workpiece about a fixed axis with the radial displacement of an end facing tool from that axis to maintain a constant feed rate or cutting speed of the workpiece to the tool as the tool moves radially across the workpiece. A doubled rodded piston has one rod connected to drive the tool and a second rod which projects into the chamber of a master cylinder. Fluid displaced from the master cylinder by tool driving movement of the piston is employed to drive a slave piston coupled to a speed control of a variable speed motor which drives the workpiece in rotation.

4 Claims, 1 Drawing Sheet

4,745,832

HYDRAULIC SPEED CONTROL SYSTEM

BACKGROUND OF THE INVENTION

The present invention is directed to a hydraulic control system especially designed to coordinate the rate of rotation of a workpiece about a fixed axis with the rate of movement of a cutting tool radially across the end face of the rotating workpiece so that the cutting speed or rate of movement of the workpiece past the tool remains constant at all times.

It is well known that for a given metal machining operation, there is an optimum cutting speed which results in the most efficient compromise between cycle time, tool life and cutting efficiency. The maintaining of a substantially constant cutting speed presents a problem in the case where an end facing operation is performed on a rotating workpiece by advancing a cutting tool radially across the face toward the axis of rotation. Assuming a constant rotary speed of the workpiece, the linear speed of the workpiece past the tool at the point of contact between the tool and workpiece is directly proportional to and varies with the radial distance between the tool and the axis of rotation of the workpiece. While various mechanisms or control systems have been devised to achieve a constant cutting speed in an end facing operation, such systems typically require the employment of complex mechanisms or electrical control circuitry.

The present invention is directed to a control system designed to achieve a constant cutting speed in an end facing machining operation which may be produced, installed and maintained at a relatively low cost and which will maintain a constant cutting speed in a simple and fool proof manner.

SUMMARY OF THE INVENTION

In accordance with the present invention, the workpiece to be machined is driven in rotation about a stationary axis by a variable speed motor. The cutting tool is driven radially across the end face of the rotating workpiece by a double ended piston having piston rods extending from both ends of its cylinder. One piston rod is coupled to the tool to drive the tool upon movement of the piston; the other piston rod projects from its cylinder into the interior of a hydraulically separate master cylinder to act as the master cylinder piston. The master cylinder chamber is in turn hydraulically connected to a slave cylinder so that the slave cylinder piston is driven in movement coordinated with that of the tool. The slave cylinder piston in turn is connected to a control which controls the speed of the variable speed motor which drives the workpiece in rotation to increase the rate of rotation of the workpiece as the tool moves radially inwardly.

This system thus hydraulically positions the speed control of the variable speed workpiece drive motor in precise accordance with the position of the tool radially of the axis of rotation of the workpiece.

Other objects and features of the invention will become apparent by reference to the following specification and to the drawings.

DESCRIPTION OF THE PREFERRED EMBODIMENT

Figure 1:
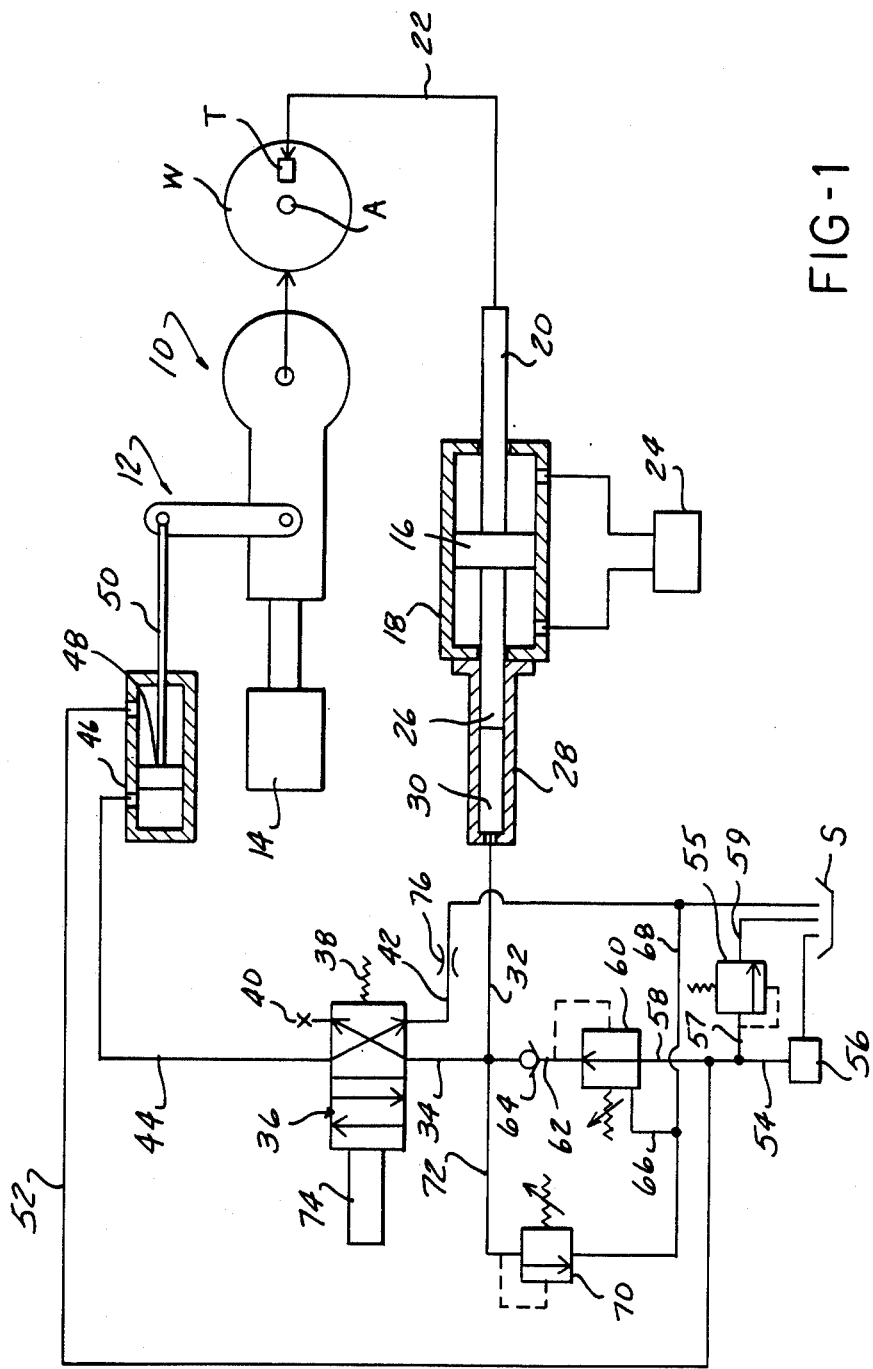
FIG. 1 is a schematic diagram of a hydraulic circuit embodying the present invention.

In FIG. 1, there is presented a schematic diagram of a system embodying the present invention designed to coordinate the rate of rotation of a workpiece W about a stationary axis A with the rate of movement of a tool T along a path extending radially of the axis A in an end facing machining operation to maintain a constant cutting speed. The workpiece W is driven in rotation by a variable speed motor designated generally 10 which includes a speed control lever designated generally 12 movable to vary the speed of motor 10 and thus the rate of rotation of workpiece W. Although other types of variable speed motors may be employed to drive the workpiece W in rotation, preferably motor 10 takes the form of an axial piston motor connected in a closed loop circuit to a pump 14. The speed or rate of rotation of motor 10 is varied, in a well known manner, by tilting the swash plate of motor 10 by means of control lever 12.

The tool T is driven in reciprocatory movement radially across the face of workpiece W by reciprocation of a piston 16 within a main drive cylinder 18. Piston 16 is a double rodded piston having a first piston rod 20 projecting from one end of cylinder 18 to be mechanically coupled by a mechanical connection schematically indicated at 22 to the tool T so that, as viewed in FIG. 1, the direction of movement of the tool T is the same as the direction of movement of piston 16 within cylinder 18. Flow of fluid to and from the opposite ends of cylinder 18 to drive piston 16 in movement within the cylinder is under the control of a hydraulic control circuit designated generally 24. A second piston rod 26 fixed to piston 16 projects from the opposite end of cylinder 8 into a master cylinder 28 having a chamber 30 which is hydraulically isolated from the interior of cylinder 18.

Chamber 30 of master cylinder 28 is hydraulically connected via conduits 32, 34 to one port of a reversing valve 36 which is normally biased to the position shown in FIG. 1 by a spring 38. With valve 36 in the position shown in FIG. 1, conduit 34 is connected via the valve to a plugged port of the valve schematically indicated at 40. With valve 36 in the illustrated position, the valve establishes a connection between a sump conduit 42 leading from the valve to a sump S and a control conduit 44 which extends from valve 36 to the head end of a control slave cylinder 46. A piston 48 slidably received within slave cylinder 46 is coupled by its piston rod 50 to control lever 12 of the workpiece drive motor 10.

The rod end of slave cyliner 46 is connected via conduit 52, 54 to the outlet or pressure side of a charge pump 56. With the connections established by valve 36 as shown in the drawings, piston 50 would be at its extreme left hand limit of movement within cylinder 46 and speed control lever 12 would be at a selected minimum speed setting.

The output conduit 54 of charge pump 56 is connected via conduit 58, a pressure regulator 60 and conduit 62 and one way check valve 64 to conduits 32, 34. Pressure regulator 60 is of well known construction, and may take the form of a Sun reducing valve model PBDB-LEV which may be set at some desired operating pressure, typically 50 psi. Valve 60 therefore limits pressure in conduit 62 between valve 60 and one way check valve 64 to 50 psi.

A conduit 72 connects conduits 32, 34 to a pressure relief valve 70 which is set to open at a higher pressure setting, for example, 200 psi, than the setting of pressure reducing valve 60. This pressure relief circuit constituted by conduit 72, relief valve 70 and conduit 68 is employed solely for safety purposes, such as in the event of a mechanical malfunction, and does not directly participate in the normal operation of the control system.

The system shown in the drawing operates to vary the speed of rotation of the workpiece W as the tool moves in its operating stroke radially across the end face of the workpiece. During the cutting operation, the tool is driven by piston 16 to move radially inwardly across the face of the workpiece, and as the tool moves radially toward the axis of rotation A of the workpiece, the speed of rotation of the workpiece is progressively increased by the system illustrated so that the linear speed of the workpiece past the tool remains constant throughout the full range of radial movement of the tool relative to the workpiece axis.

To condition the system to exert this controlling action, a solenoid 74 is energized to shift valve 36 from the position shown in the drawing to position the straight through connections of valve 36 in respective alignment with conduits 34 and 42.

It will assumed that at this time, the tool T is in its retracted position at some location radially outwardly of the periphery of the workpiece.

Conduit 34, as well as conduit 32 and the master cylinder chamber 30 have been pressurized by charge pump 56 to the pressure setting of reducing valve 60 (50 psi) and upon the shifting of valve 36 oil flow can be transmitted through the valve to control conduit 44 and the head end chamber of cylinder 46. This connection thus allows oil to be displaced from chamber 30 of master cylinder 28 through conduits 32 and 34, valve 36, conduit 44, and cause piston 48 of slave cylinder 46 to move right as piston rod 26 moves into chamber 30.

As explained above, prior to the shifting of valve 36 the head end chamber of cylinder 46 was connected to sump and piston 48 was at its extreme left hand limit of movement as viewed in the drawing, thus positioning control lever 12 at its minimum speed position. Oil from charge pump 56 under pressure of say 150 psi as controlled by charge pump relief valve 55 holds piston 48 at its extreme left position.

To commence an operating cycle, the tool drive control circuit 24 is conditioned to supply pressure to the right hand face of drive piston 16 and to vent the chamber of cylinder 18 at the left hand side of piston 16. This action causes piston 16 to stroke to the left as viewed in the drawings and this movement of the piston moves the tool T to the left into cutting engagement with the face of the rotating workpiece W at the outer periphery of the workpiece. As the piston 16 and the tool continue to move to the left as viewed in the drawings, piston rod 26 advances into master cylinder chamber 30 and displaces fluid in chamber 30 through conduits 32, 34, valve 36 and control conduit 44 to the head end of slave cylinder of chamber 46, thus causing slave piston 48 to stroke to the right as viewed in the drawings, to pivot control lever 12 of motor 10 in a direction which increases the rotary speed of the motor, and hence the workpiece. Charge pump relief valve 55 acts at this time, accommodating the venting of fluid from the rod end chamber of control cylinder 46 via conduit 52, conduit 57, valve 55, and sump conduit 59. Charge pump pressure on the opposite side of piston 48 is always overcome during the operating stroke of tool T, hence fluid displaced from master chamber cylinder 30 by the advancing of piston rod 26 into this chamber is conducted via valve 36 to the head end of control or slave cylinder 46 to drive piston 48 in speed controlling movement. Thus, throughout the full range of movement of tool T radially inwardly of workpiece W, the speed of motor 10 is precisely coordinated with the radial position of the tool so that the speed of that portion of the workpiece which is moving into cutting relationship with the tool remains constant.

After the tool has completed its cutting stroke, the hydraulic connections to drive cylinder 18 are reversed to return the tool to its fully retracted position. Solenoid 74 may be deenergized at any time after the tool has completed its working stroke, de-energization of the solenoid restoring valve 36 to its illustrated position in which the head end of slave cylinder 46 is connected by valve 36 to sump with the constant charge pump pressure applied to the rod end of cylinder 46 then driving piston 48 back to the left to restore control lever 12 to its minimum speed position. The rate at which piston 48 returns to its minimum speed position may be regulated by a restriction 76 in sump passage 42.

One way check valve 64 functions to assure that oil being transmitted during master-slave operation is not lost from the master-slave circuit through valve 60.

While one embodiment of the invention has been described in detail, it will be apparent to those skilled in the art the disclosed embodiment may be modified. Therefore, the foregoing description is to be considered exemplary, rather than limiting, and the true scope of the invention is that defined in the following claims.

The invention claimed is:

1. A control system for coordinating the rate of rotation of a workpiece about a fixed axis of rotation to the rate of movement of a cutting tool radially of said axis in cutting relationship to said workpiece to maintain a constant cutting speed, said system comprising reciprocable means for driving said tool in radial movement toward and away from said axis, variable speed drive means for driving said workpiece in rotation about said axis, and including speed control means movable in a first direction to increase the speed of said drive means and movable in the opposite direction to decrease the speed of said drive means, a master cylinder having a master piston reciprocable therein, a slave cylinder having a slave piston reciprocable therein, fluid filled conduit means operable to establish a fluid connection between said master cylinder and said slave cylinder to hydraulically transmit movement of said master piston to said slave piston, first means coupling said master piston to said reciprocable means to reciprocate said master piston in said master cylinder in coordination with reciprocating movement of said tool by said reciprocable means, and second means coupling said slave piston to said control means to move said control means in said first direction in coordination with movement of said tool radially toward said axis.

2. The invention defined in claim 1 wherein said reciprocable means comprises a hydraulic cylinder having a drive piston slidably mounted therein, a first piston rod fixed to one side of said drive piston and projecting from one end of said hydraulic cylinder, means coupling said first piston rod to said tool to transmit movement of said drive piston to said tool, a second piston rod fixed to the opposite side of said drive piston and projecting from the opposite end of said hydraulic cylinder into said master cylinder to constitute said master piston.

3. The invention defined in claim 1 wherein said second means comprises a piston rod on said slave piston projecting from one end of said slave cylinder, said slave cylinder having a first port at said one end thereof and a second port at the opposite end thereof, respectively opening into said slave cylinder at opposite sides of said slave piston a source of fluid under pressure, first conduit means connecting said source to said first port, second conduit means connecting said source to said fluid filled conduit means, a fluid sump, and valve means selectively operable to connect said second port to said sump or to said second conduit means.

4. The invention defined in claim 3 wherein said valve means includes a pressure port, a sump port, a control port, and a valve member operable in a first position to connect said control port to said sump port and operable in a second position to connect said control port to said pressure port, said fluid filled conduit means comprises a master cylinder conduit connecting said master cylinder to said pressure port and a slave cylinder conduit connecting said control port to said second port of said slave cylinder, a pressure conduit connecting said source to said master cylinder conduit, and one way check valve means in said pressure conduit permitting fluid flow from said source to said master cylinder conduit and preventing fluid flow from said master cylinder conduit to said source.

* * * * *